(12) United States Patent
Murata et al.

(10) Patent No.: US 10,667,614 B2
(45) Date of Patent: Jun. 2, 2020

(54) LONG SYNTHETIC RESIN FOAM BODY

(71) Applicant: JSP CORPORATION, Tokyo (JP)

(72) Inventors: Seishiro Murata, Saitama (JP); Hiroyuki Ito, Hiroshima (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 16/089,624

(22) PCT Filed: Feb. 17, 2017

(86) PCT No.: PCT/JP2017/005898
§ 371 (c)(1),
(2) Date: Sep. 28, 2018

(87) PCT Pub. No.: WO2017/175490
PCT Pub. Date: Oct. 12, 2017

(65) Prior Publication Data
US 2019/0099002 A1    Apr. 4, 2019

(30) Foreign Application Priority Data
Apr. 8, 2016  (JP) ................. 2016-77763

(51) Int. Cl.
A47C 7/20         (2006.01)
A47C 27/16        (2006.01)
(Continued)

(52) U.S. Cl.
CPC .............. *A47C 7/20* (2013.01); *A47C 27/146* (2013.01); *A47C 27/16* (2013.01); *B29C 44/12* (2013.01);
(Continued)

(58) Field of Classification Search
CPC ......... Y10T 428/22; A47C 7/20; B29C 70/68; B29C 70/82; B29C 44/12; B32B 3/08; B32B 3/085
See application file for complete search history.

(56) References Cited

U.S. PATENT DOCUMENTS

2017/0334106 A1   11/2017  Sameshima et al.

FOREIGN PATENT DOCUMENTS

DE    2942284 A1   4/1981
EP    1512350 A1   3/2005
(Continued)

OTHER PUBLICATIONS

International Search Report in related PCT Application No. PCT/JP2017/005898, dated May 9, 2017.
(Continued)

*Primary Examiner* — Alexander S Thomas
(74) *Attorney, Agent, or Firm* — Bacon & Thomas, PLLC

(57) ABSTRACT

A long synthetic resin foam body composed of a thermoplastic resin expanded beads-molded substrate and a frame having displacement regulating sections provided at both ends in the longitudinal or lateral direction of the substrate and a connecting section that connects the displacement regulating sections to each other. The substrate has at least one joint forming portion that divides the substrate in a direction intersecting the connecting section into two or more substrate parts. The joint forming portion has a joint that connects the adjacent two substrate parts to each other and is deformable to permit a relative displacement between the adjacent two substrate parts when the substrate contracts or expands.

11 Claims, 14 Drawing Sheets

(51) Int. Cl.
*A47C 27/14* (2006.01)
*B29C 44/12* (2006.01)
*B29C 44/44* (2006.01)
*B60N 2/70* (2006.01)
B32B 3/08 (2006.01)
B29L 12/00 (2006.01)

(52) U.S. Cl.
CPC .......... *B29C 44/445* (2013.01); *B60N 2/7017* (2013.01); *B29L 2012/00* (2013.01); *B32B 3/08* (2013.01); *B32B 3/085* (2013.01); *Y10T 428/22* (2015.01)

(56) References Cited

FOREIGN PATENT DOCUMENTS

| | | |
|---|---|---|
| JP | 2003034192 A | 2/2003 |
| JP | 4221280 B2 | 2/2009 |
| JP | 2011111131 A | 6/2011 |
| JP | 2013230189 A | 11/2013 |
| JP | 2015174340 A | 10/2015 |

OTHER PUBLICATIONS

Written Opinion in related PCT Application No. PCT/JP2017/005898, dated May 9, 2017.
Supplementary European Search Report in corresponding European Application No. 17778869, dated Jul. 25, 2019.

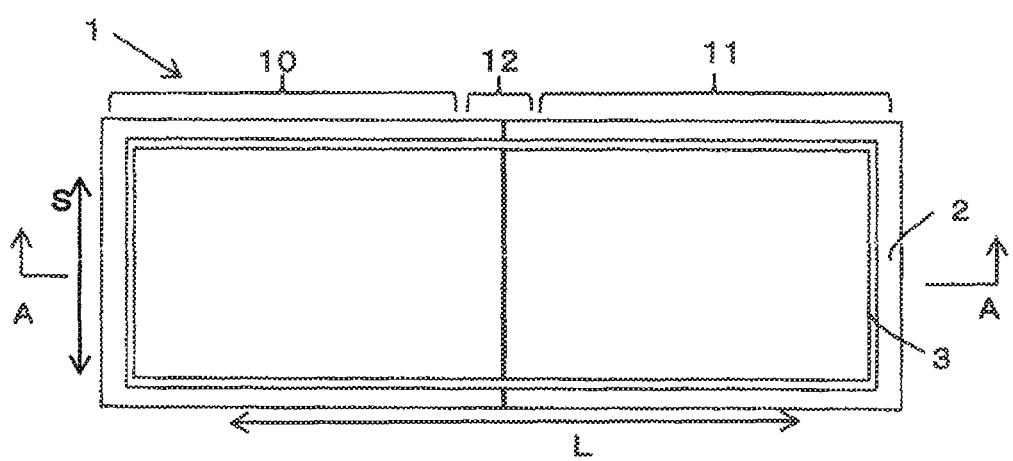
Fig. 1a
Fig. 1b
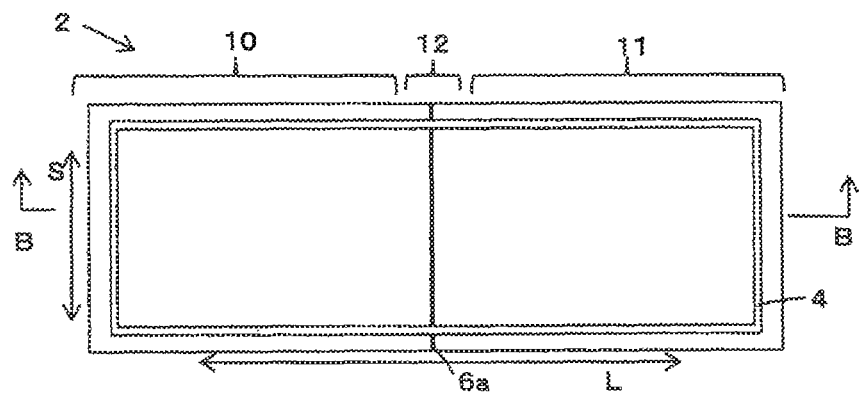
Fig. 2a
Fig. 2b
Fig. 2c

LONG SYNTHETIC RESIN FOAM BODY

TECHNICAL FIELD

The present invention relates to a long synthetic resin foam body and, more specifically, to a long length thermoplastic resin foam body usable for many purposes and exhibiting excellent dimensional stability irrespective of whether it is under high temperature or low temperature conditions.

RELATED ART

Molded articles of synthetic resin foam bodies generally have a light weight and flexibility and yet show a certain level of rigidity and excellent shock absorbing property and, therefore, are extensively used in a wide variety of fields such as automobile parts, packaging materials and household miscellaneous goods. Synthetic resin foam bodies are, however, generally formed from innumerable cells in the form of closed cells of the resin containing a large amount of air or a gas. Therefore, the foam bodies have a high linear expansion coefficient and greatly expand or contract when subjected to environmental temperature changes. Thus, a problem that the dimensional change is great is caused particularly when the foam body is a long length part, although a dimensional change is not problematic in the case of a small-sized part in which an amount of the dimensional change is small.

Among synthetic resin foam bodies, a thermoplastic resin expanded beads-molded body, which can be easily molded into a desired shape, may be obtained by filling the expanded beads in a mold, then heating the expanded beads with, for example, steam, to fusion-bond them. After cooling, the foam body is taken out from the mold. Such a molded article formed of an expanded beads-molded article body has encountered a problem that a large dimensional variation of the molded article is liable to be caused as compared with other resin parts even by a small variation of the expansion ratio of the expanded beads, the temperature and pressure of steam, temperature of cooling water, mold tool and temperature of the atmosphere into which the molded product is taken out of the mold. Especially when the molded article is a long length expanded beads-molded body, there are caused problems in assembling to another part such as formation of a practically undesirable gap and deformation thereof by interference with another part, because not only expansion and contraction by an environment temperature change but also variation of dimensions at the time of molding is apt to occur.

In this circumstance, in order to ensure dimensional accuracy of an elongated part of a synthetic resin foam body, there has been adopted, although reluctantly, as a first method, a measure in which cut finishing is carried out as post processing or a measure of dividing into a plural parts to avoid production of an elongated body.

As a second method, there is a method to suppress expansion and contraction of a molded article of an expanded beads-molded body. In this method, a material having a small linear expansion coefficient and rigidity, such as a metal wire frame, is previously set in a mold and then thermoplastic resin expanded beads are filled in the mold. The wire frame is subjected to insert molding and is thus employed also for the purpose of adding means to function as a reinforcement and a mounting part. Such a method is partially used in a part such as a sun visor or a rear seat of an automobile for the purpose of decreasing the weight thereof. Since expansion and contraction by a temperature change of an expanded beads-molded body that is surrounded by and positioned inside a frame made of a material showing a low tendency to expand and contract by a temperature change, such as a metal wire frame, are forcibly suppressed by the frame, a dimensional change of the part made of the expanded beads-molded body as a whole is only ascribed to the expansion and contraction of that portion of the synthetic resin foam body which is located outside the region surrounded by the frame. Therefore, the part as a whole shows good dimensional stability.

Patent Document 1 discloses an automobile interior ceiling forming body which has a seven-layered structure having a foamed polypropylene sheet laminated, on its both sides, with a glass fiber sheet laminate structural body that is composed of a glass fiber sheet and a polypropylene sheet laminated on each of the both sides of the glass fiber sheet. This technique intends to ensure a dimensional accuracy by use of the glass fiber.

RELATED ART DOCUMENTS

Patent Document

Patent document 1: Japanese Laid Open Patent Publication No. JP-A-2003-34192

SUMMARY OF THE INVENTION

Problems to be Solved by the Invention

In the case of the first method, there is a problem because the method causes cost up due to the post processing and division and because the method has to be limited to application to the case that permits post processing or division, as is seen in the case of an elongated part formed of a synthetic resin in-mold molded body, such as a nap bed for trucks, a one piece-type seat back for a rear seat of automobiles and a cushioning material for furniture.

The second method encounters a problem in the case where the strength of the wire frame is set to such a range of the bending strength and tensile strength as to achieve the primary objects of use thereof as well as to achieve the reduction of the weight or in the case where the shape or mounting position thereof has an offset. Namely, when a long part is to be produced, the expanded beads-molded body cannot withstand a temporal strong contraction force exerted when it is taken out from the mold and is brought into contact with outside air immediately after the in-mold molding and, therefore, deformation such as warp occurs in the whole region of the synthetic resin in-mold molded body and remains disappear.

The invention of Patent Document 1 has a problem because the manufacturing costs are high for reasons that the structure of the polypropylene foam laminate is complicated. Additionally, the laminate is suited for use as an automobile interior ceiling member but is not suited for use as a one piece-type seat back for a rear seat of automobiles or as a heat insulating material for being embedded between columns of a house.

Thus, it is an object of the present invention to provide a long length synthetic resin foam body which is suited for use as a core material of a seat back or seat cushion of a rear seat of automobiles, a furniture, a nap bed for trucks, etc., which is light in weight and which ensures excellent dimensional accuracy.

Means for Solving the Problems

The gist of the present invention pertaining to a long part 1 formed of a synthetic resin foam body is as follows:

(1) A long synthetic resin foam body comprising:
a thermoplastic resin expanded beads-molded substrate that has a longitudinal direction, a lateral direction and a thickness direction, and
a frame that has a pair of displacement regulating sections which are longitudinally or laterally spaced apart from each other and provided in said substrate at positions spaced inward from opposing longitudinal or lateral ends of said substrate and at least one connecting section which connects the paired displacement regulating sections to each other,
said substrate having at least one joint forming portion that divides said substrate in a direction intersecting the connecting section into two or more substrate parts,
said joint forming portion having at least one joint that connects adjacent two substrate parts to each other, and
said joint being deformable to permit a relative displacement between the adjacent two substrate parts when said substrate contracts or expands;
(2) The long synthetic resin foam body as recited in above (1), wherein said joint has one end connected to one of adjacent two substrate parts at a first connecting location and the other end connected to the other one of the substrate parts at a second connecting location which is offset from said first connecting location in the longitudinal direction, lateral direction and/or thickness direction;
(3) The long synthetic resin foam body as recited in above (1), wherein said joint has a curved or bent shape and has one end connected to a one of adjacent two substrate parts at a first connecting location and the other end connected to a the other one of the substrate parts at a second connecting location which aligns with said first connecting location in all of the longitudinal direction, lateral direction and thickness direction;
(4) The long synthetic resin foam body as recited in any one of above (1) to (3), wherein each of said displacement regulating sections is in closely fitting engagement with said substrate;
(5) The long synthetic resin foam body as recited in any one of above (1) to (3), wherein said substrate has a pair of laterally extending grooves provided adjacent to both longitudinal ends of said substrate and said displacement regulating sections are in the form of plates closely fitting engagement in said grooves;
(6) The long synthetic resin foam body as recited any one of above (1) to (3), wherein said substrate has a pair of protrusions provided adjacent to both longitudinal ends of said substrate and said displacement regulating sections are in the form recesses that are in closely fitting engagement with said protrusions;
(7) The long synthetic resin foam body as recited in any one of above (1) to (3), wherein said substrate has a pair of holes provided adjacent to each of both longitudinal ends of said substrate and said displacement regulating sections are in the form of protrusions closely fitting engagement with said holes;
(8) The long synthetic resin foam body as recited in any one of above (1) to (5), wherein said frame has an annular structure in which said paired displacement regulating sections are connected at their ends by a pair of the connecting sections;
(9) The long synthetic resin foam body as recited in any one of above (1) to (8), wherein the thermoplastic resin expanded beads are polyolefin-based resin expanded beads;
(10) The long synthetic resin foam body as recited in any one of above (1) to (8), wherein the thermoplastic resin expanded beads are expanded beads of a base resin that is a composite resin of a polyolefin-based resin and a polystyrene-based resin;
(11) The long synthetic resin foam body as recited in any one of above (1) to (10), wherein the thermoplastic resin expanded beads-molded substrate has a bending deflection of 20 mm or more and a load of 2 to 100 N at bending deflection of 20 mm, both of which are measured by a bending test method according to JIS K7221-2 (2006);
(12) The long synthetic resin foam body as recited in any one of above (1) to (5), wherein said frame is an annular metal wire frame having first two opposed frame sections serving as said displacement regulating sections and second two opposed frame sections that connect the first two opposed frame sections to each other and that serve as said connecting sections; and
(13) The long synthetic resin foam body as recited in any one of above (1) to (3), wherein said frame is integrally embedded in said substrate by insert molding.

Effect of the Invention

The long synthetic resin foam body recited in above (1) to (3) can effectively suppress a dimensional variation during the in-mold molding of the thermoplastic resin expanded beads-molded substrate as well as the expansion and contraction thereof by a temperature change after the in-mold molding.

The long foamed body of the synthetic resin foam body recited in above (4) permits easy removal of the frame fitted therein and easy disintegration thereof into respective components for recycling.

The invention recited in above (5) to (7) is embodied in various forms of the frame and long foam body substrate which is formed of a synthetic resin foam body whose longitudinal dimension is apt to vary. The invention shows an effect that it is applicable even when the object and mode of use of the long foam body are varied.

The invention as recited in in above (8) in which an annular frame is used can achieve both excellent dimensional stability and lightness in weight.

The invention recited in above (9) and (10) provides preferred embodiments of the thermoplastic resin expanded beads-molded body that constitutes the substrate.

The invention recited in above (11) provides particularly preferred embodiment of the thermoplastic resin expanded beads-molded body that constitutes the substrate.

The invention recited in above (12) provides particularly preferred embodiment among the exemplified frames.

In the long synthetic resin foam body recited in above (13) in which the frame and substrate are integrally molded in a mold by insert molding, the frame can be firmly fixed in the substrate. Additionally, as compared with a case in which the frame is in fitting engagement with the substrate, it is possible to reduce the process steps for obtaining the long foam body of the present invention.

BRIEF DESCRIPTION OF THE DRAWINGS

FIG. 1a and FIG. 1b are illustrations of one embodiment of the long foam body of the present invention that uses a substrate separated into two in the longitudinal direction, in which FIG. 1a is a plan view and FIG. 1b is a cross-sectional view taken along A-A in (a).

FIG. 2a, FIG. 2b, and FIG. 2c are illustrations of a substrate used in the long foam body of FIGS. 1a and 1b, in which FIG. 2a is a plan view, FIG. 2b is a cross-sectional view taken along B-B in FIG. 2a and FIG. 2c is a front view.

FIG. 3a, FIG. 3b, and FIG. 3c are explanatory views of an embodiment of a frame used in the long foam body of FIGS. 1a and 1b, in which FIG. 3a is a plan view, FIG. 3b is a front view and FIG. 3c is a plan view of a frame of another embodiment.

FIG. 4a, FIG. 4b, and FIG. 4c are partial enlarged front views explanatory of bending deformation of a joint that connects two substrate parts of a long foam body of the present invention, in which FIG. 4a is an illustration showing a non-load state, FIG. 4b is an illustration showing the bending deformation of the joint at a time when the two substrate parts are relatively displaced in the mutually approaching direction as a result of longitudinal extension of the substrate and FIG. 4c is an illustration showing the bending deformation of the joint at a time when the two substrate parts are relatively displaced in a mutually departing direction as a result of shrinkage of the substrate.

FIG. 5a, FIG. 5b, and FIG. 5c are partial enlarged front views showing a joint that connects two substrate parts of a long foam body according to another embodiment of the present invention, in which FIG. 5a is an illustration showing a non-load state, FIG. 5b is an illustration showing the bending deformation of the joint at a time when the two substrate parts are relatively displaced in the mutually approaching direction as a result of longitudinal extension of the substrate and FIG. 5c is an illustration showing the bending deformation of the joint at a time when the two substrate parts are relatively displaced in a mutually departing direction as a result of shrinkage of the substrate.

FIG. 6a and FIG. 6b are illustrations showing another embodiment of the long foam body of the present invention, in which FIG. 6a is a plan view showing an embodiment provided with joint forming portions in two positions in the longitudinal direction and FIG. 6b is a view illustrating an embodiment provided with two joints at opposite end portions in the lateral direction of the substrate that is separated into two in the longitudinal direction.

FIG. 7a and FIG. 7b are illustrations showing another embodiment of the long foam body of the present invention that is composed of a substrate separated into two in the lateral direction and an annular frame, in which FIG. 7a is a plan view and FIG. 7b is a cross-sectional view taken along A-A in FIG. 7a.

FIG. 8a, FIG. 8b, and FIG. 8c are explanatory plan views showing various embodiments of a joint having the same thickness as that of the substrate, in which FIG. 8a shows a Z-shaped joint, FIG. 8b shows a V-shaped joint and FIG. 8c shows an X-shaped joint.

FIG. 9a and FIG. 9b are explanatory plan views showing an embodiment of a joint having a different thickness from that of the substrate, in which FIG. 9a is a plan view and FIG. 9b is a front view.

FIG. 10a and FIG. 10b are explanatory plan views showing another embodiment of a joint having a different thickness from that of the substrate, in which FIG. 10a is a plan view and FIG. 10b is a front view.

FIG. 11a and FIG. 11b are explanatory plan views showing a further embodiment of a joint having a different thickness from that of the substrate, in which FIG. 11a is a plan view and FIG. 11b is a front view.

FIG. 12a and FIG. 12b are illustration explanatorys of a fitting-engagement state between a groove provided in the substrate of FIGS. 2a-2c and a displacement regulating section of the frame of FIGS. 3a-3c, in which FIG. 12a is a sectional view of the groove of the substrate at a portion D in FIG. 2b and FIG. 12b is a sectional view showing a fitting-engagement state between the displacement regulating section in FIG. 3a and the groove of the substrate of FIG. 1b at a portion C.

FIG. 13a and FIG. 13b are illustration of another embodiment of the long foam body of the present invention that uses a substrate separated into two in the longitudinal direction, in which FIG. 13a is a plan view and FIG. 13b is a cross-sectional view taken along C-C in FIG. 13a.

FIG. 14a and FIG. 14b are illustrations of a substrate used in the long foam body of FIGS. 13a-13b, in which FIG. 14a is a plan view and FIG. 14b is a cross-sectional view taken along D-D in FIG. 14a.

FIG. 15a and FIG. 15b are illustrations of a frame used in the long foam body of FIGS. 13a-13b, in which FIG. 15a is a plan view and FIG. 15b is a cross-sectional view taken along E-E in FIG. 15a.

FIG. 16a, FIG. 16b, and FIG. 16c are illustrations of another embodiment of the long foam body of the present invention that uses a substrate separated into two in the longitudinal direction, in which FIG. 16a is a plan view, FIG. 16b is a bottom view and FIG. 16c is a cross-sectional view taken along F-F in FIG. 16a.

FIG. 17a and FIG. 17b are illustrations of a substrate used in the long foam body of FIGS. 16a-16c, in which FIG. 17a is a plan view and FIG. 17b is a cross-sectional view taken along G-G in FIG. 17a.

FIG. 18a and FIG. 18b are explanatory views of the frame used in the long foam body of FIGS. 16a-16c, in which FIG. 18a is a plan view, FIG. 18b is a cross-sectional view taken along H-H in FIG. 18a.

PREFERRED EMBODIMENTS OF THE INVENTION

Figure 3A:
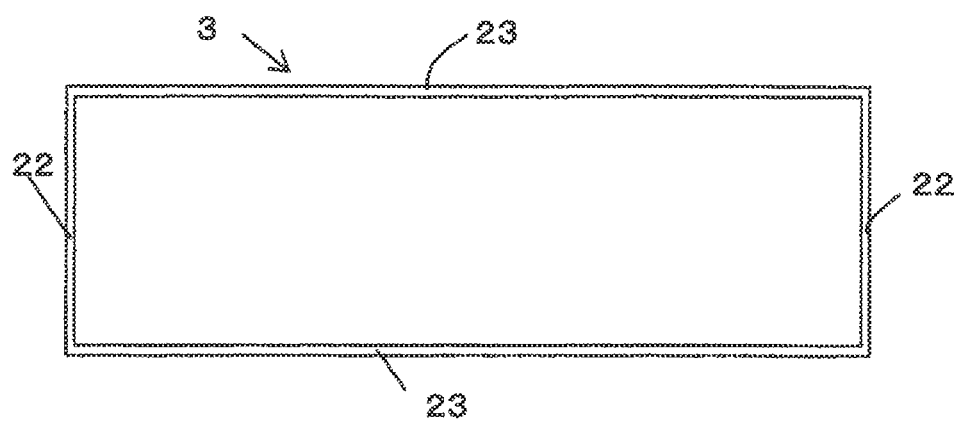

Referring to FIG. 1 to FIG. 18, a long synthetic resin foam body 1 according to the present invention is comprised of a thermoplastic resin expanded beads-substrate 2 that has a longitudinal direction L, a lateral direction S and a thickness direction T, which directions are orthogonal to each other. Incidentally, the long foam body of the present invention generally has a dimension in the longitudinal direction L which is 650 mm or more and a generally rectangular shape as seen in plan view. The synthetic resin foam body 1 preferably has a bending deflection of 20 mm or more and a load of 2 to 100 N at bending deflection of 20 mm, both of which are measured by a bending test method according to JIS K7221-2 (2006). More preferably, the bending deflection is 50 mm or more and the load of 10 to 50 N at bending deflection of 20 mm. The bending test according to JIS K7221-2 (2006) uses a method in which a test piece having a length of 350 mm, a width of 100 mm and a thickness of 25 mm is used to obtain a load-deflection curve in the atmosphere of 23° C.±2° C. and a relative humidity of 50±5% under loading conditions involving an inter-fulcrum distance of 300 mm and a test speed of 20±1 mm/min. The long foam body 1 is further comprised of a frame 3 that has a pair of displacement regulating sections 22 provided in both end portions in the longitudinal or lateral direction of the substrate 2 and a connecting section 23 that connects the displacement regulating sections 22 to each other. The substrate 2 has at least one joint forming portion 12 that divides the substrate in a direction intersecting the connecting section 23 into two or more substrate parts 10 and 11. The joint forming portion 12 serves to function as a stress absorbing section of the substrate 2 and has at least one joint 5 that connects adjacent two spaced apart substrate parts 10 and 11 to each other and that is bending deformable to permit a relative displacement between the adjacent two substrate parts 10 and 11 when the substrate 2 contracts or expands. Because the joint 5 is made deformable, the substrate parts 10 and 11 can be displaced relative to each other. As a consequence, the total length dimension of the substrate 2 in the longitudinal direction, etc. is stabilized and maintained at a value in a constant range.

Figure 7A:
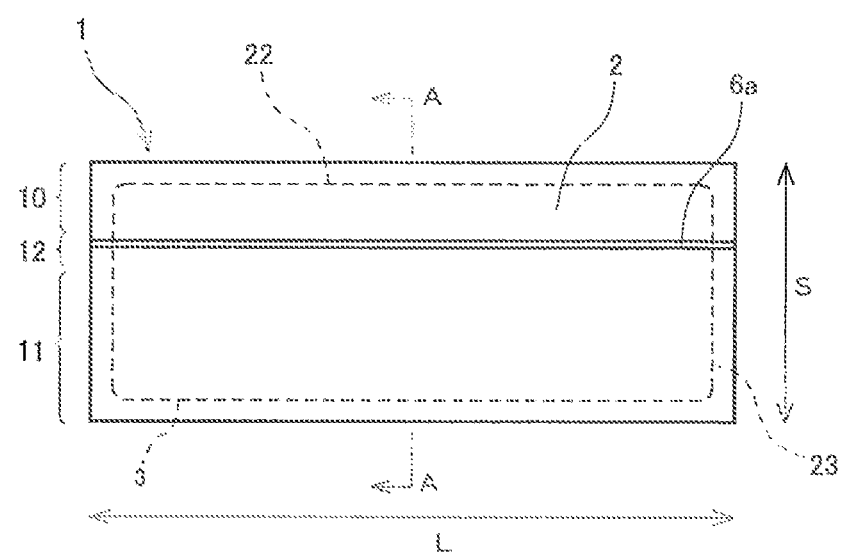
Figure 7B:
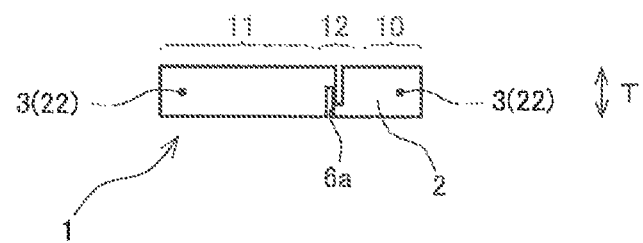

In a preferred embodiment, the joint has one end connected to one of adjacent two spaced apart substrate parts 10 at a first connecting location K and the other end connected to the other one of the substrate parts 11 at a second connecting location K which is offset from said first connecting location in the longitudinal direction, lateral direction and/or thickness direction. In another preferred embodiment, the joint 5 has a curved or bent shape and has one end connected to one of adjacent two spaced apart substrate parts 10 at a first connecting location and the other end connected to the other one of the substrate parts 11 at a second connecting location which aligns with the first connecting location in all of the longitudinal direction, lateral direction and thickness direction. Thus, the first connecting location and the second connecting location are directly opposed to each other. Because the joint 5 is thus configured to be deformable, the adjacent two substrate parts 10 and 11 are made displaceable relative to each other. As a consequence, the total dimension of the substrate 2 in the longitudinal direction and/or lateral direction may be stabilized and maintained at a value in a certain range. Incidentally, as shown in FIG. 7, the frame 3 may be embedded in the substrate 2 by insert molding and integrally provided in the substrate 2. Further, as shown in FIG. 7, the substrate parts 10 and 11 may be divided and separated in the lateral direction S.

Further, adjacent two substrate parts 10 and 11 in a separated state may be connected to each other by means of a plurality of joints 5 that are formed discontinuously.

The present invention is characterized first in that a thermoplastic resin expanded beads-molded substrate 2 is separated into substrate parts 10 and 11 in the longitudinal direction L or lateral direction S by a joint forming portion 12, with these substrate parts being connected to each other by a joint 5 of the joint forming portion 12 so as to be flexibly displaceable relative to each other when subjected to compression or stretching in the longitudinal direction L or lateral direction S, and second in that displacement regulating sections 22 of a frame 3 having rigidity, such as wire, pipe or plate, are integrated with the substrate 2 by being fitted in the substrate 2 or by being insert molded in the substrate 2. As a result of these features, the dimensions in the longitudinal direction and/or lateral direction of the long synthetic resin foam body 1 of the present invention are stabilized.

The long synthetic resin foam body 1 is comprised of the thermoplastic resin expanded beads-molded substrate 2. The synthetic resin expanded beads are a material composed of cells containing a large amount of air or a gas. Therefore, the dimensions of the expanded beads-molded body are liable to vary by a great number of factors such as a steam temperature or pressure, a cooling water temperature, a difference in a molding device used in in-mold molding, a temperature of the outside atmosphere and a variation of the expansion ratio of the raw material expanded beads. For example, in the case of a polypropylene expanded beads-molded body, a dimensional variation of about ±0.7 to 1.2% is generally caused in the product dimensions. Such a variation corresponds to about ±10 mm in the case of an expanded beads-molded substrate having a length of 1,000 mm. Therefore, when a frame 3 is fitted into a groove of an expanded beads-molded substrate, for example, it is practically impossible to form the groove of the expanded beads-molded substrate produced by in-mold molding at a precise position and in precise dimensions, even when a section for forming the groove into which a displacement regulating section 22 of the frame 3 is to be fitted is designed on the mold. Further, though the expanded beads-molded substrate used in the present invention has flexibility, it also has a certain degree of rigidity. Therefore, it is impossible for a worker to closely fit a rigid body such as a frame into the groove of the substrate that has a variation of ±10 mm in its dimensions. When an insert molding method is adopted to embed the frame 3 within the expanded beads-molded substrate, on the other hand, the frame 3 is unable to withstand a high contraction force of the expanded beads-molded substrate and deforms after completion of the in-mold molding. Thus, there is caused a phenomenon that deformation such as warp occurs in the entire expanded beads-molded substrate and remains disappear.

The long synthetic resin foam body 1 of the present invention has a structure which ensures dimensional accuracy in spite of using a substrate having such a property that the dimensional accuracy is apt to vary.

Description will be first made of the substrate 2. The substrate 2 is formed of a thermoplastic resin expanded beads-molded body and is, for example, a long foam body as shown in FIG. 1 and FIG. 2 that has a longitudinal direction L and a lateral direction S as seen in plan view. It is preferred that the substrate 2 has a bending deflection of 20 mm or more and a load of 2 to 100 N at bending deflection of 20 mm, both of which are measured by a bending test method according to JIS K7221-2 (2006).

The thermoplastic resin expanded beads-molded substrate 2 of the present invention may be formed by filling thermoplastic resin expanded beads in a mold and, thereafter, heating the expanded beads with a heating medium such as steam to fusion-bond the expanded beads to each other into an unitary body. More specifically, the substrate 2 is a thermoplastic resin expanded beads-molded substrate that is formed of, as a base resin, a polyolefin-based resin such as polypropylene and polyethylene; a polystyrene-based resin; or a composite resin (modified polystyrene resin) of a polyolefin-based resin and a polystyrene-based resin. A material which easily causes breakage or irreversible deformation by bending deformation is not suitable. The expanded beads-molded substrate 2 preferably has a density of 0.015 to 0.3 g/cm$^3$, more preferably 0.02 to 0.2 g/cm$^3$, particularly preferably 0.025 to 0.1 g/cm$^3$. The density of the expanded beads-molded substrate 2 herein is as calculated by dividing the mass of the substrate by the volume thereof.

Further, the substrate 2 is composed of substrate parts 10 and 11 which are adjacent to each other and separated in the longitudinal direction L or lateral direction S, and a joint forming portion 12 which connects the substrate parts 10 and 11 to each other. Thus, in the present invention, the substrate 2 is divided by at least one joint forming portion 12 into two or more substrate parts. For the purpose of simplifying the explanation, the following description will be primarily made on the substrate 2 which is divided into two substrate parts 10 and 11 by only one joint forming portion 12. The substrate parts 10 and 11 are connected to each other by a joint 5 of the joint forming portion 12. It is preferred that the substrate parts 10 and 11 are connected to each other only by the joint 5 of the joint forming portion 12 and that there is no portion in which the adjacent two substrate parts 10 and 11 are continuous with each other. Namely, if the adjacent two substrate parts 10 and 11 are directly connected to each other, other than through the joint, a stress exerted by expansion and contraction of the substrate 2 will not be able be absorbed and there will be brought about variation in dimensional accuracy of a long foam body 1 constituted of such expanded beads-molded substrate 2.

Figure 17A:
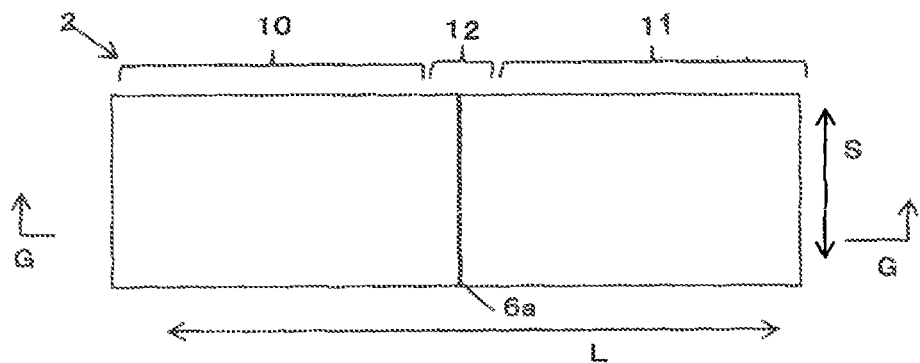
Figure 17B:
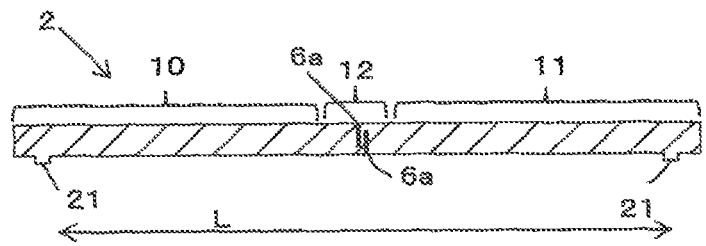

When the frame 3 is in fitting engagement with the long substrate 2, the substrate 2 is formed with a fitting-engagement portion 21, into which the displacement regulating section 22 of the frame 3 is fittable, at each of the both longitudinal end portions or both lateral end portions of the substrate 2. The fitting-engagement portion 21 of the substrate 2 may be embodied, for example, in the form of a groove as shown in FIG. 2, in the form of holes as shown in FIG. 14 or in the form of protrusions as shown in FIG. 17.

Figure 3B:
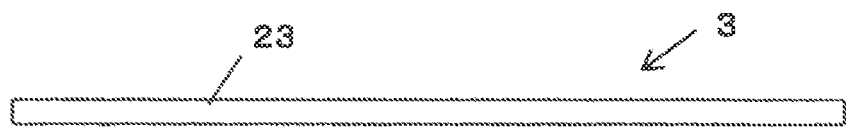
Figure 3C:
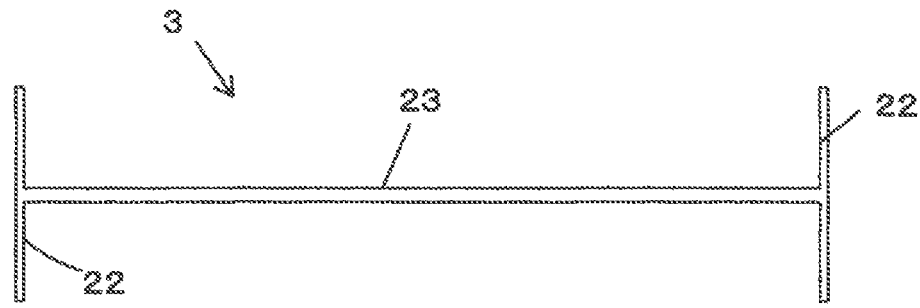

When the fitting-engagement portion 21 of the substrate 2 is a groove, the configuration thereof is determined as appropriate depending upon the configuration of the frame 3. For example, when the frame 3 is an annular shape as shown in FIG. 3(*a*), grooves, which extend in the lateral direction and configured to be fittingly engaged with displacement regulating sections 22 of the frame 3, are formed at both end portions, in the longitudinal direction L, of the substrate 2 in the state as shown in FIG. 2(*a*) in a plan view, in FIG. 2(*b*) in a cross-sectional view taken along B-B and in FIG. 2(*c*) in a front view and, additionally, longitudinal grooves which are configured to be fittingly engaged with interconnecting sections 23 of the frame 3 are formed, so that an annular groove 4 (FIG. 2(*a*)) is formed as a whole. When the connecting section 23 of the frame 3 is single as shown in FIG. 3(*c*), the groove 4 is H-shaped as a whole. Incidentally, the groove 4 may be formed on a top side of the substrate 2 or on a bottom side thereof.

It is important that that portion of the synthetic resin foam body in the fitting-engagement portion 21 which is to be located adjacent to an outer or inner side of the displacement regulating section 22, namely the periphery of the groove into which the displacement regulating section 22 is brought into fitting engagement must have a sufficient rigidity. Namely, it is necessary that the periphery of the fitting-engagement portion should have a rigidity sufficient to withstand a restraint force exerted from the displacement regulating section 22 fitted therein at a time the expanded beads-substrate 2 expands or contracts when subjected to under a high or low temperature. If the periphery of the fitting-engagement portion does not have a sufficient rigidity, the periphery of the groove will be damaged or deformed when the expanded beads-molded body expands or contracts, thereby to cause disengagement of the frame 3 and inhibition of the effect of prevention of expansion or contraction of the expanded beads-molded body. It is, therefore, preferred that the thickness of the substrate at the outside and inside of the fitting-engagement portion is 8 mm or more, more preferably 15 mm or more, though the thickness depends on the shape and physical properties of the long foam body 1 and the shape and position of the frame 3.

Figure 14A:
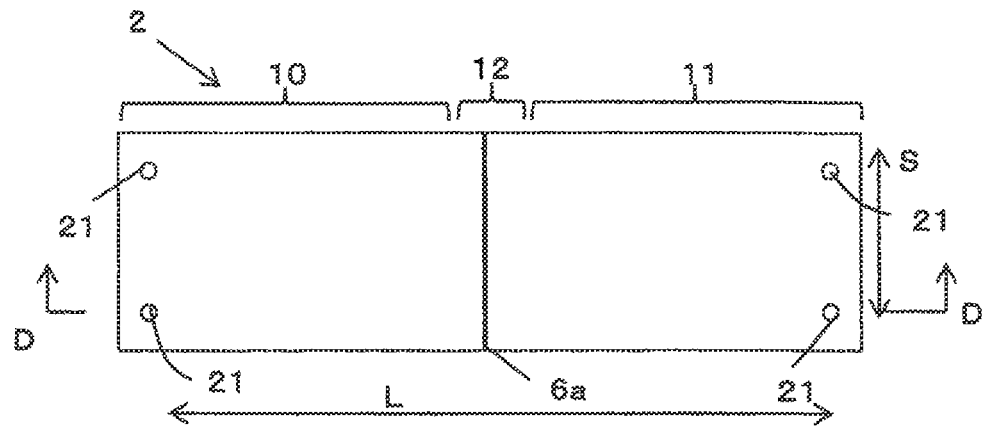
Figure 14B:
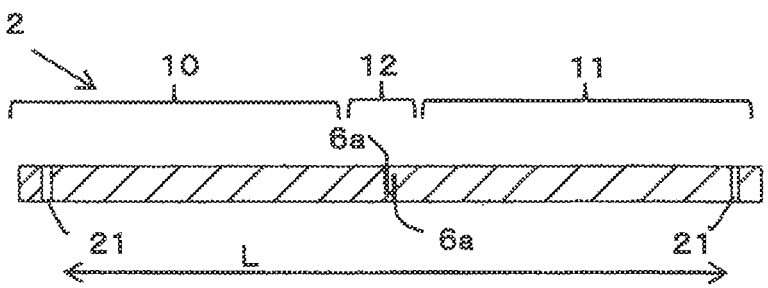
Figure 15A:
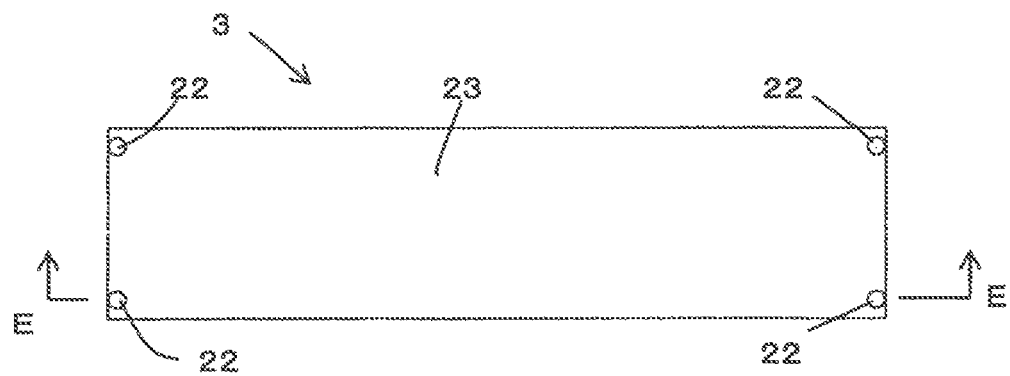
Figure 15B:
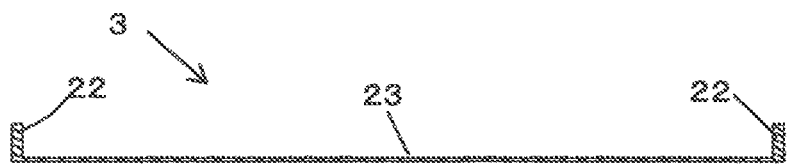

When the fitting-engagement portion 21 of the substrate is in the form of holes, such holes are formed, for example, at both end portions in the longitudinal direction L of the substrate 2 in the state as shown in FIG. 14(*a*) in a plan view and in FIG. 14(*b*) in a cross-sectional view taken along D-D. The length in the lateral direction S of the holes and the number thereof may be determined such that the contact area, established when the protrusion-shape displacement regulating sections 22 of the frame 3 as shown in FIG. 15 are brought into closely fitting engagement with the inside walls of the holes in the longitudinal direction L, is sufficient to prevent the holes of the fitting-engagement portion 21 of the substrate that are fixed by the displacement regulating sections 22 from being broken by the expansion or contraction force of the substrate 2.

When the fitting-engagement portion 21 of the substrate is in the form of protrusions, such protrusions are formed at both end portions in the longitudinal direction L of the substrate 2 in the state as shown in FIG. 17(*a*) in a plan view and in FIG. 17(*b*) in a cross-sectional view taken along G-G. The length in the lateral direction S of the protrusions and the number thereof may be determined such that the contact area, established when recesses, that serve as the displacement regulating section 22 of the frame 3 as shown in FIG. 18, are brought into closely fitting engagement with the outside walls of the protrusions in the longitudinal direction L, is sufficient to prevent the protrusions of the fitting-engagement portion 21 of the substrate that are fixed by the displacement regulating section 22 from being broken by the expansion or contraction force of the substrate 2.

Next, the frame 3 will be described. The frame 3 has displacement regulating sections 22 and 22 that are configured to be located in both end portions in the longitudinal direction L or lateral direction S of the substrate 2 when fitted into the substrate 2 or integrally molded with the substrate 2, and a connecting section 23 that connects the displacement regulating sections 22 and 22 to each other. Because the displacement regulating sections 22 are interconnected by the connecting section 23, the dimension between both ends of the displacement regulating sections 22 may be stabilized and maintained in a determined value.

The frame 3 is used to improve the strength of the substrate and the material thereof may be selected from those having both a low degree of dimensional expansion and contraction by a temperature change and a rigidity. The frame 3 may be formed of a material having a low linear expansion coefficient (generally $5 \times 10^{-6}$/° C. to $30 \times 10^{-6}$/° C.) and a high rigidity (tensile strength is generally 200 N/mm$^2$ to 2,000 N/mm$^2$, preferably 250 N/mm$^2$ to 1,300 N/mm$^2$, as measured according to JIS G3532). Concretely, there may be mentioned a metal such as iron, aluminum an alloy thereof, wood and a resin reinforced with glass fibers, carbon fibers, polyamide fibers, etc. Of these, the frame made of a metal is preferred. The frame is particularly preferably formed of a metal wire material (solid bar) or a hollow metal pipe having a diameter of 2 to 8 mm and a tensile strength of 200 N/mm$^2$ or more as determined according to JIS G3532 for reasons of light weight property and substrate reinforcing efficiency.

Figure 18A:
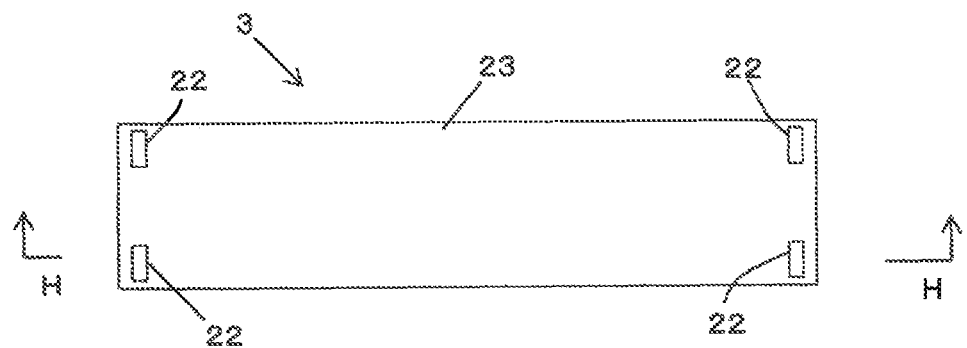
Figure 18B:
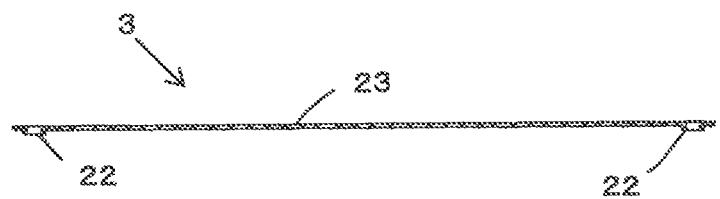

The displacement regulating sections 22 of the frame 3 may be, for example, each in the form of a strip-shaped plate as shown in FIG. 3, in the form of a wire structure as shown in FIG. 7, in the form of a protrusion structure as shown in FIG. 15 or in the form of a recess structure as shown in FIG. 18. The connecting section 23 may be, for example, in the form of a strip-shaped plate as shown in FIG. 3, in the form of a wire structure as shown in FIG. 7 or in the form of a plate structure as shown in FIG. 15 and FIG. 18. The combination of the form of the displacement regulating sections and the form of the connecting section 23 may be chosen at will. From the standpoint of lightness in weight and substrate reinforcing efficiency, it is preferred that the frame 3 is an annular frame composed of a pair of displacement regulating sections 22 and 22 which are to be provided in both end portions in the longitudinal direction L or in the lateral direction S and a pair of connecting sections 23 and 23 which connect the displacement regulating sections 22 and 22 to each other at their opposite end portions. Among the annular frames, those which have corners, for example rectangular annular frames, are particularly preferred from the standpoint excellent light weight property and rigidity.

When the displacement regulating section 22 is in the form of a strip-shaped plate, the combination of the displacement regulating section 22 with the connecting section 23 may be an annular shape configuration, as shown in FIG. 3(*a*) and FIG. 3(*b*), or an H-shaped configuration as shown in FIG. 3(*c*). In these cases, the thickness of the strip-shaped plate in the longitudinal direction L of the displacement regulating section 22 is such as to allow close-fit thereof with the width of the groove in the longitudinal direction L of the fitting-engagement portion 21 of the substrate 2.

When the displacement regulating section 22 is in the form of a protrusion structure, preferably used is the displacement regulating section 22 that is composed of a plurality of bar-shaped protrusion structures connected by a plate-shaped connecting section 23 as shown in FIG. 15(*a*) or 15(*b*).

When the displacement regulating section 22 is in the form of a recess structure, preferably used are displacement regulating sections 22 that are connected by a plate-shaped connecting section 23 and that are composed of a plurality of recess structures each having a hole in one side thereof as shown in FIGS. 18(*a*) and 18(*b*).

Figure 13A:
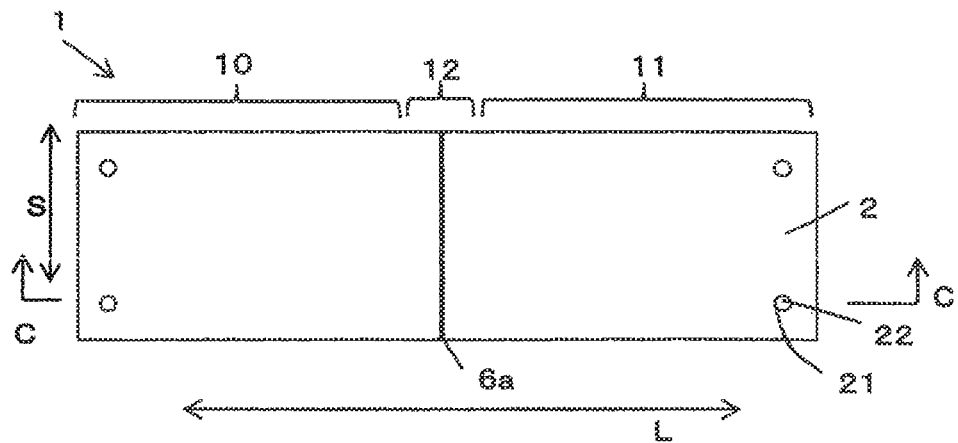
Figure 13B:
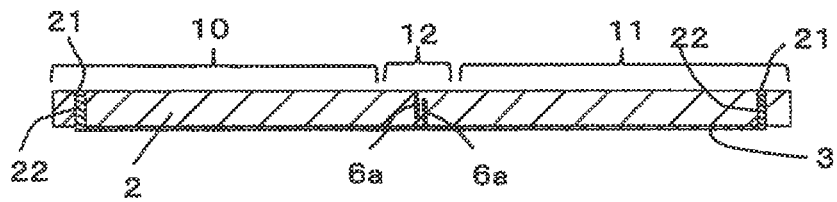
Figure 16A:
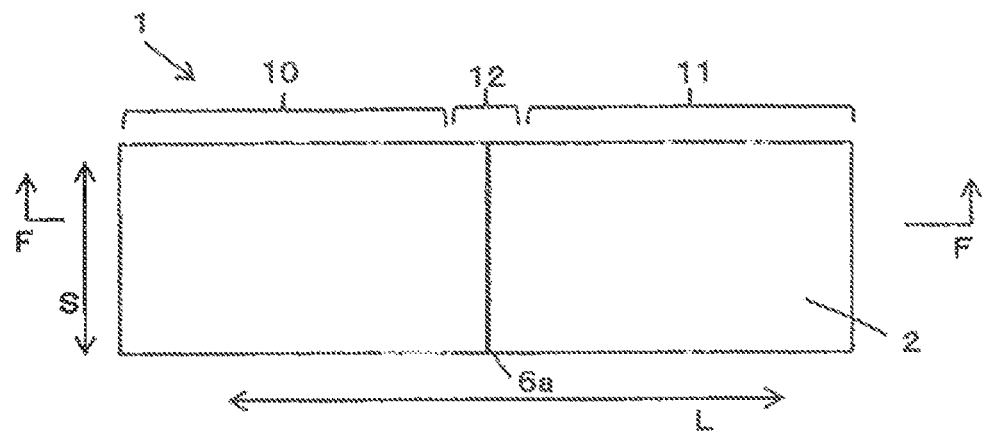
Figure 16B:
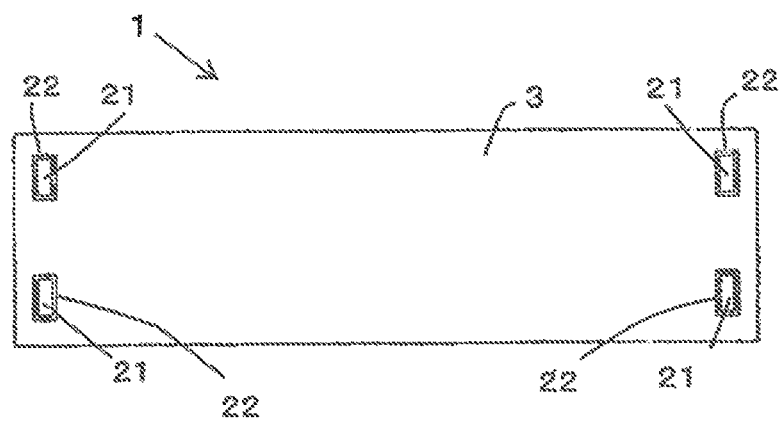
Figure 16C:
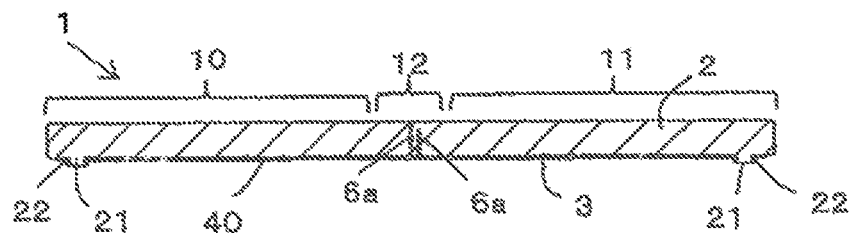

The long synthetic resin foam body 1 is comprised of a combination of the substrate 2 and the frame 3. For example, when the substrate 2 provided with grooves as shown in FIG. 2 is combined with the annular frame 3 as shown in FIG. 3(*a*), there is obtained a configuration in which, as shown in FIG. 1(*a*) and FIG. 1((*b*), strip-shaped plate structures of the displacement regulating sections 22 are in fitting engagement with the grooves of the fitting engagement portion 21. When the substrate 2 provided with holes as shown in FIG. 14 is combined with the frame 3 having bar-shaped protrusion structure as shown in FIG. 15, there is obtained a configuration in which, as shown in FIG. 13, bar-shaped protrusion structures of the displacement regulating sections 22 are in fitting engagement with the holes of the fitting engagement portion 21. When the substrate 2 provided with protrusions as shown in FIG. 17 is combined with the frame 3 having recess-shaped structure of holes as shown in FIG. 18, there is obtained a configuration in which, as shown in FIG. 16, protrusions of the fitting engagement portion 21 are in fitting engagement with the holes of the displacement regulating sections 22.

As shown in FIG. 7, when the substrate 2 is integrally molded with a rectangular annular frame 3 formed of a wire-shaped structure, there is obtained a configuration in which the displacement regulating sections 22 of the frame are embedded within the substrate 2 at positions inside the opposite ends thereof. The combination of the substrate 2 and the dimension regulating member is not limited only to the configurations shown in FIG. 1, FIG. 13, FIG. 16 and FIG. 7. As long as the configuration is a fitting-engagement structure or an embedding structure capable of suppressing variation of the dimension of the long substrate 2 in the longitudinal direction L and/or lateral directions, any configuration may be adopted.

Next, the joint forming portion 12 of the substrate 2 will be described. As shown in FIG. 1, FIG. 2, FIG. 6 and FIG. 7, the joint forming portion 12 divides the substrate 2 in a direction intersecting the connecting section 23 of the frame 3 into substrate parts 10 and 11 and has one or a plurality of joints 5 that connect the substrate parts 10 and 11, which are spaced apart from each other in the longitudinal direction L and/or lateral direction S, to each other at a desired position in the longitudinal direction L and/or lateral direction S.

Figure 6A:
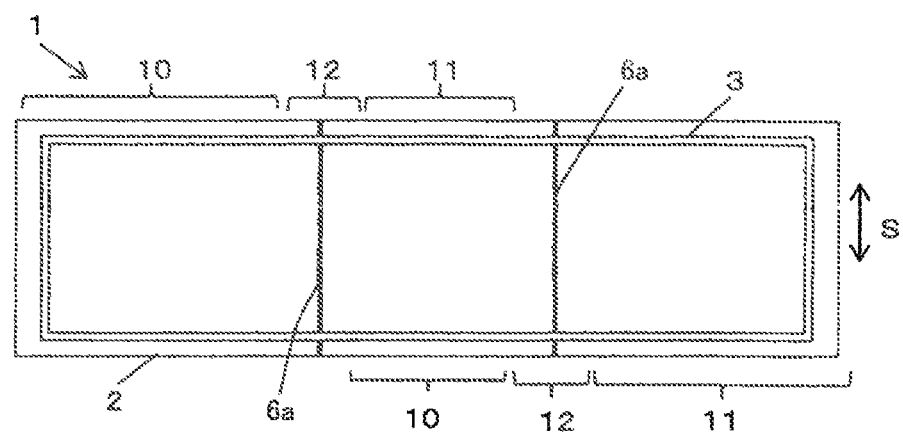

Examples of configuration in which a single joint forming portion 12 is provided in the substrate 2 include an embodiment in which, as shown in FIG. 1, FIG. 2 and FIG. 6(*b*), the joint forming portion 12 is provided in one position in the longitudinal direction L and extends throughout the length in the lateral direction S and an embodiment in which, as shown in FIG. 7, the joint forming portion 12 is provided in one position in the lateral direction S and extends throughout the length in the longitudinal direction L. Examples of configuration in which a plurality of joint forming portions 12 are provided in the substrate 2 include an embodiment in which, as shown in FIG. 6(*a*), two joint forming portions 12 are arranged in the longitudinal direction L and each extend throughout the length in the lateral direction S. The disposing configuration of the joint forming portion 12 in the substrate 2 is not particularly limited; i.e. any disposing configuration may be adopted as long as the joint forming portion 12 can exhibit stress absorbing function. Although not shown, there may be adopted a configuration in which the separated substrate parts that are spaced apart in the longitudinal direction L and/or in the lateral direction S are intermittently connected by a plurality of joints 5.

Next, the joint 5 which constitutes the joint forming portion 12 will be described. As shown in FIG. 2, FIG. 4, FIG. 5, FIG. 7 and FIG. 8 to FIG. 11, the joint forming portion 12 is comprised of the joint 5 which connects, to each other, the substrate parts 10 and 11 that are spaced apart from each other. The joint 5 has its both ends connected at connecting locations K to respective opposed surfaces of the substrate parts 10 and 11. In one embodiment of the present invention, the connecting locations K of the substrate parts 10 and 11 are linked in such a state that they are offset from each other in at least one of the longitudinal direction L, lateral direction S and thickness direction T. In the case of FIG. 2, for example, the connecting locations K are linked in such a state that they are offset from each other in the thickness direction T. In another embodiment, as shown in FIG. 5, the positions of the connection locations K are directly opposed to each other in the longitudinal direction L, lateral direction S and thickness direction T, and the joint 5 itself is a bent shaped body. Such a joint 5 that is capable of causing bending deflection is formed as a consequence of formation of groove-shaped recesses 6*a* and through hole recesses 6 in the joint forming portion 12.

When the ends of the joint 5 are connected to respective substrate parts 10 and 11 in such a way that the positions of the connecting locations K of the opposed surfaces of the substrate parts 10 and 11 are offset from each other in the longitudinal direction L, lateral direction S or thickness direction T, or when the joint 5 itself is formed into a bent-shaped body in case where the positions of the connecting locations K are directly opposed to each other in the longitudinal direction L, lateral direction S and thickness direction T, the joint 5 can be easily bending-deformed. When the substrate 2 is expanded or contracted as a result of a temperature change thereof or replacement of the gas within the cells thereof, the joint 5 is flexibly deformed to absorb the expansion or contraction. Therefore, it is possible to prevent the deformation such as warp of the long foam body even when the substrate 2 is expanded or contracted.

It is preferred that the substrate parts 10 and 11 are connected to each other only by the joint and are not directly connected to each other. For example, as shown in FIG. 6(*b*), for the purpose of spacing the substrate parts 10 and 11 away from each other, a through hole recess 6 that opens in the thickness direction is formed in a region which is within the range of the joint forming portion 12 and in which the joint 5 is not present in the lateral direction S.

Embodiments of the joint 5 will be described by configuration of the connecting locations K of the joint 5 to substrate parts 10 and 11 on both sides thereof. The configuration of the joint 5 varies depending upon the thickness of the joint 5 relative to the substrate parts 10 and 11 and the positions of the connecting locations K in the longitudinal direction L, lateral direction S or thickness direction T.

In the case of the joint 5 of FIG. 2 and FIG. 7, the thickness of the joint 5 is the same as that of the substrate parts 10 and 11 and the positions of the connecting locations K are offset in the thickness direction T. The joint 5 is formed by forming two groove-shaped recesses 6a that open oppositely in the thickness direction. The thickness of the joint 5 in the embodiments shown in FIG. 4, FIG. 5 and FIG. 8 is the same as that of the substrate parts 10 and 11, while the thickness of the joint 5 in the embodiments shown in FIG. 9 to FIG. 11 is thinner than that of the substrate parts 10 and 11 and differs therefrom.

Figure 4A:
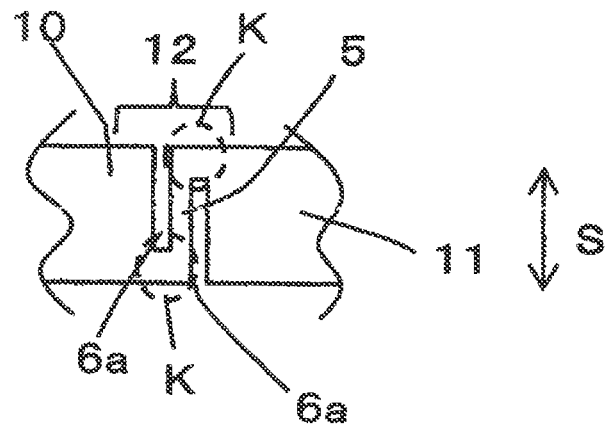
Figure 4B:
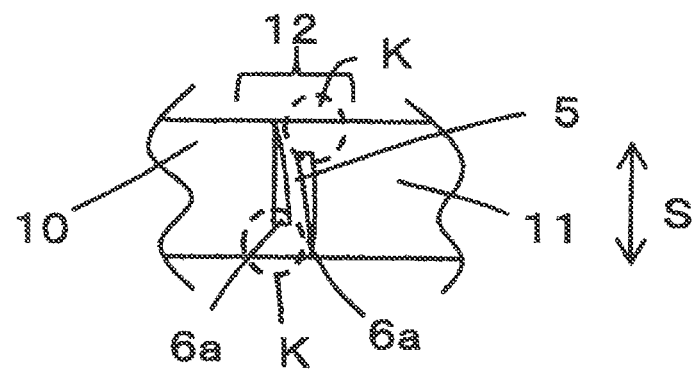
Figure 4C:
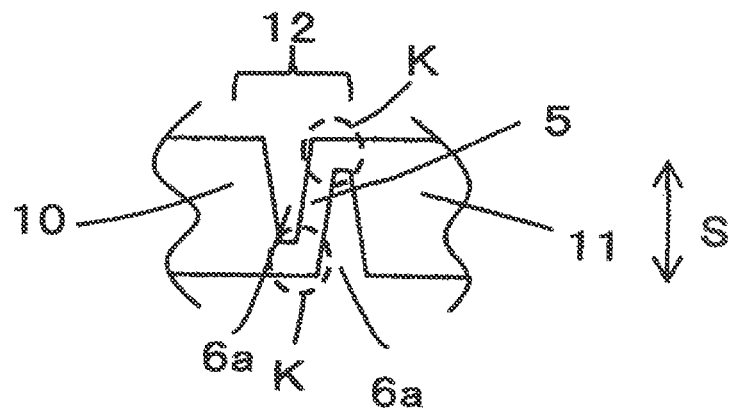
Figure 5A:
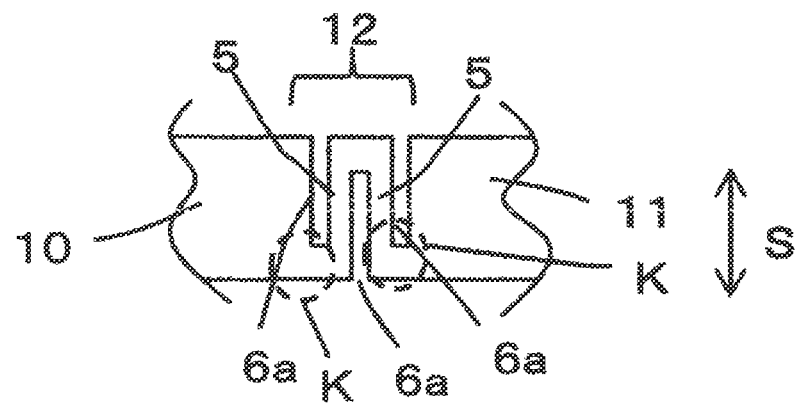
Figure 5B:
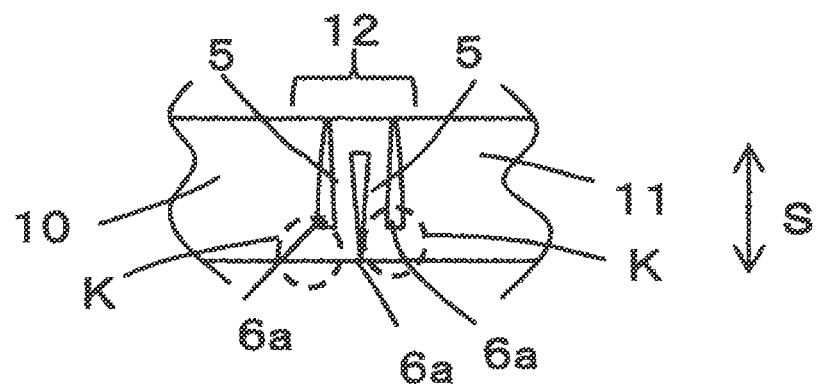
Figure 5C:
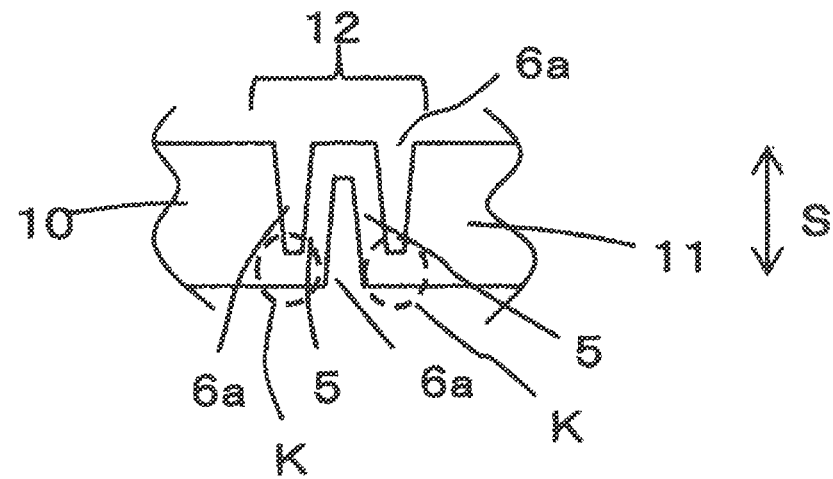
Figure 8A:
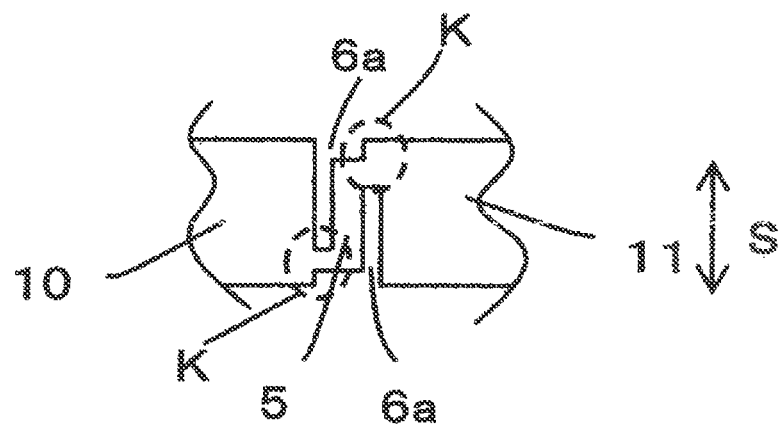
Figure 8B:
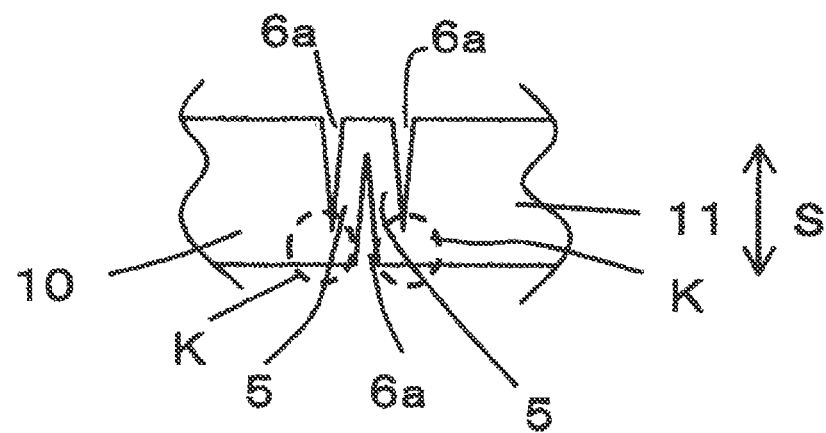
Figure 8C:
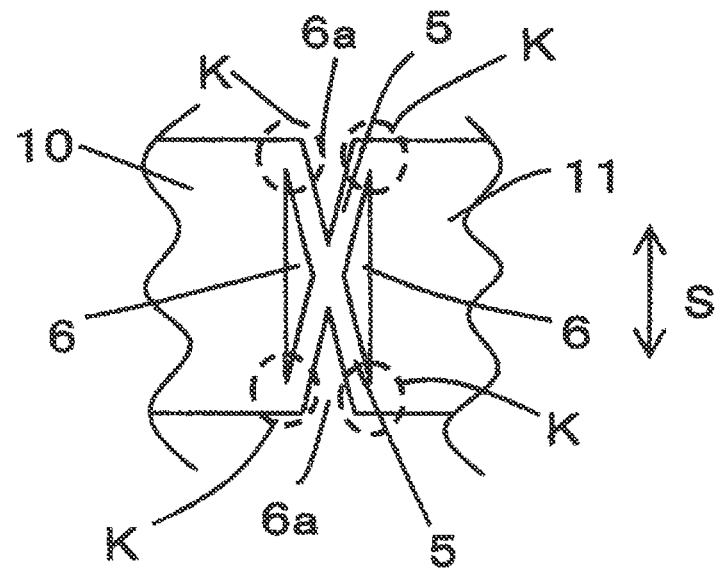
Figure 9A:
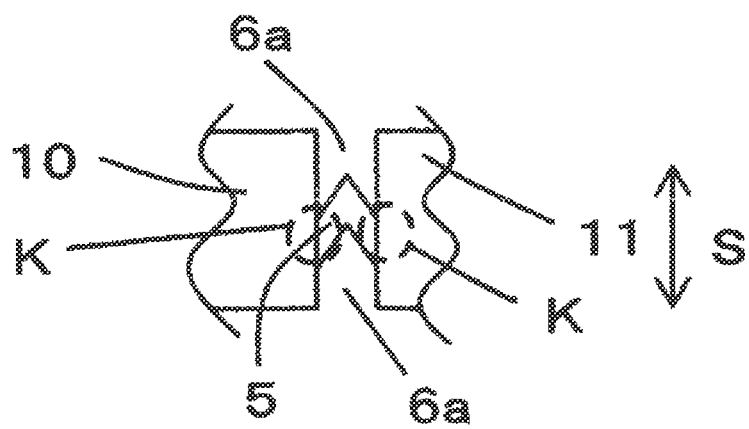
Figure 9B:
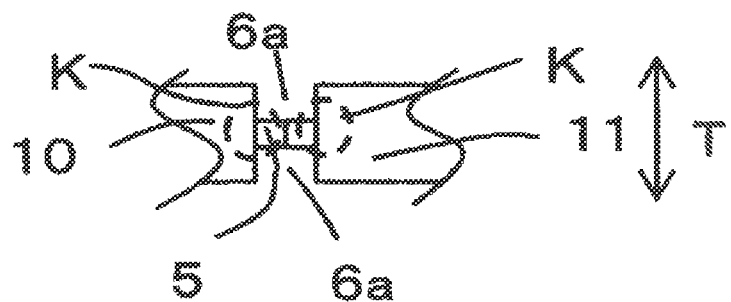

Examples of the configuration of the joint 5 in which the thickness of the joint 5 is the same as that of the substrate parts 10 and 11 and the connecting locations K are offset from each other in the longitudinal direction L or lateral direction S are shown in FIG. 4, FIG. 8(*a*) and FIG. 8(*c*). In the case of the joint 5 of FIG. 4, the connecting locations K are offset in the lateral direction S, and groove-shaped recesses 6a that open in the side surfaces are formed on both sides of the joint 5. In the case of the joint 5 of FIG. 8(*a*), the joint 5 shown in FIG. 4 is deformed in the lateral direction S. Additionally, the connecting locations K are offset in the lateral direction S, and groove-shaped recesses 6a are formed on both sides. The joint 5 of FIG. 8(*c*) is formed in an X-shaped structure. Additionally, the connecting locations K are offset in the lateral direction S, and groove-shaped recesses 6a and through hole recesses 6 are formed on both sides. The configuration of the joint 5 in the present invention is not limited to the above examples only. Any configuration may be adopted as long as the joint can be bending-deformed in the longitudinal direction and/or lateral direction so as to permit the substrate parts 10 and 11 to displace relative to each other either in the mutually departing direction when the substrate 2 contracts or in the mutually approaching direction when the substrate expands.

Next, examples of the configuration of the joint 5 in which the thickness of the joint 5 is the same as that of the substrate parts 10 and 11 and the connecting locations K are directly opposed to each other in the longitudinal direction L, lateral direction S and thickness direction T are shown in FIG. 5 and FIG. 8(*b*). In the case of FIG. 5, the positions of the connecting locations K are aligned in the longitudinal direction L, lateral direction S and thickness direction T, and the joint is formed with a bent portion and is nearly U-shaped as seen in plan view. Additionally, groove-shaped recesses 6a are formed on both sides. In the case of FIG. 8(*b*), the positions of the connecting locations K are aligned in the longitudinal direction L, lateral direction S and thickness direction T and the joint is formed with a bent portion an is nearly V-shaped as seen in plan view. Additionally, groove-shaped recesses 6a are formed on both sides. These configurations are merely examples. It is sufficient that the joint 5 is configured to be able to be bending-deformed in the longitudinal direction and/or lateral direction to permit the substrate parts 10 and 11 to displace relative to each other.

Figure 10A:
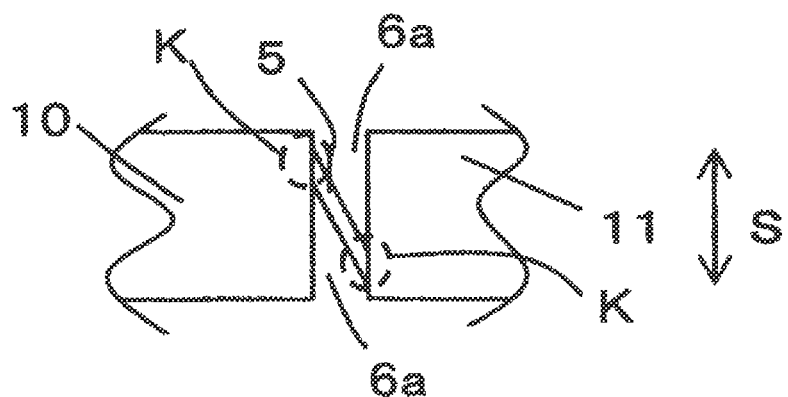
Figure 10B:
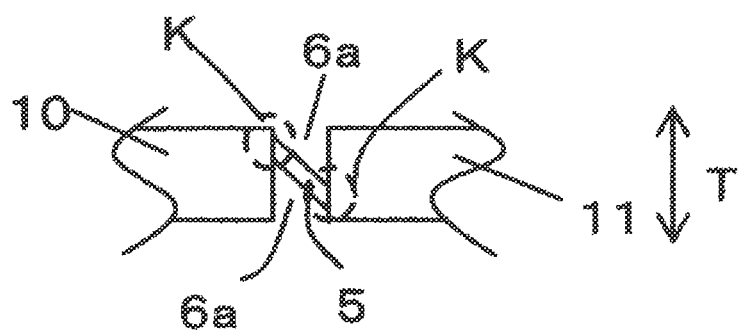
Figure 11A:
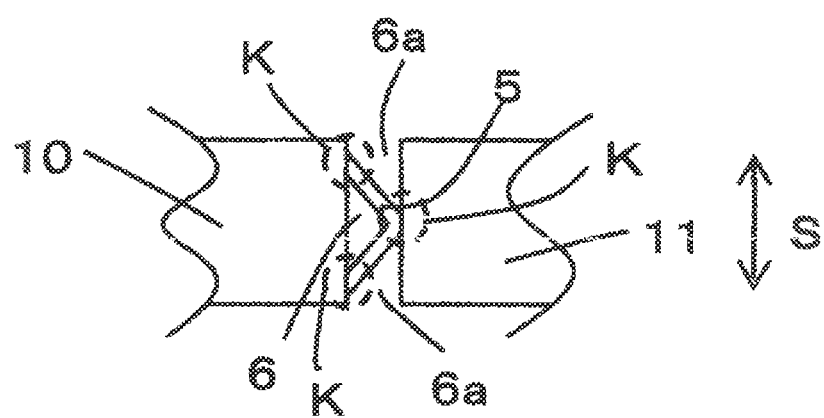
Figure 11B:
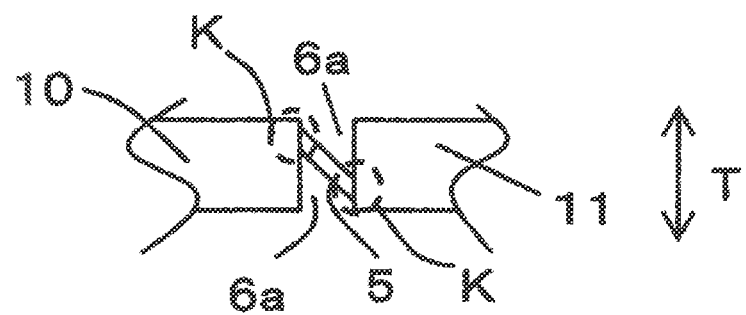
Figure 12A:
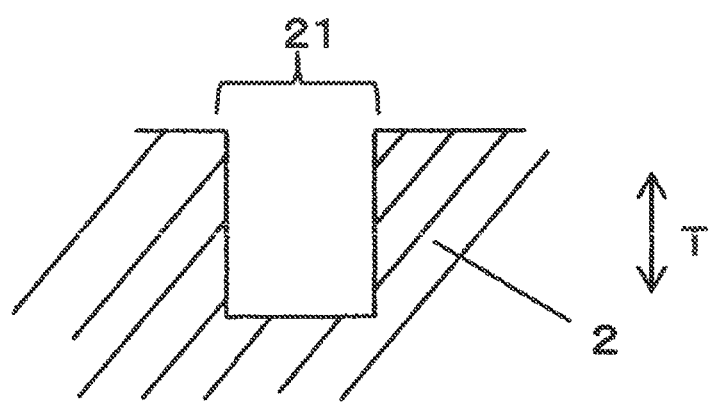
Figure 12B:
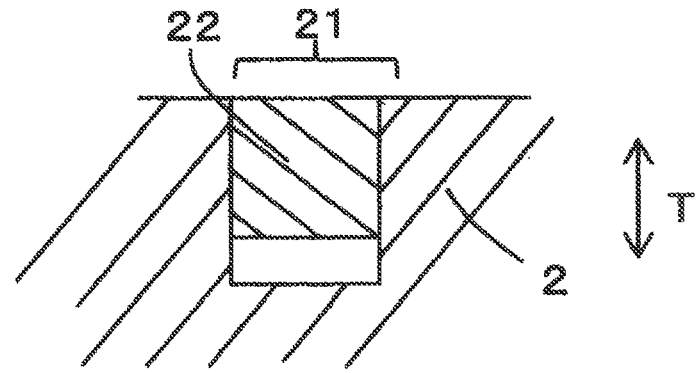

Next, examples of the configuration of the joint 5 in which the thickness of the joint 5 differs from that of the substrate parts 10 and 11 and the connecting locations K are offset from each other in the longitudinal direction L, lateral direction S or thickness direction T are shown in FIG. 10 and FIG. 11. In the case of FIG. 10, the thickness of the joint 5 is thinner than that of the substrate parts 10 and 11. Additionally, the connecting locations K are offset from each other in the lateral direction S and thickness direction T and groove-shaped recesses 6a are formed on both sides. In the case of FIG. 11, the thickness of the joint 5 is thinner than that of the substrate parts 10 and 11, and the connecting locations K are offset from each other in the lateral direction S and thickness direction T. Additionally, two connecting locations K are provided in the substrate part 10, while only one connecting location K is provided in the substrate part 11, so that the joint 5 is nearly V-shaped as seen in plan view. Further, the connecting locations K are offset from each other in the lateral direction S and thickness direction T and groove-shaped recesses 6a and a through-hole recess 6 are formed. These configurations are merely examples. It is sufficient that the joint 5 is configured to be able to be bending-deformed in the longitudinal direction and/or lateral direction to permit the substrate parts 10 and 11 to displace relative to each other.

Next, an example of the configuration of the joint 5 in which the thickness of the joint 5 differs from that of the substrate parts 10 and 11 and the connecting locations K are directly opposed to each other in the longitudinal direction L, lateral direction S and thickness direction T is shown in FIG. 9. The thickness of the joint 5 is made thinner than that of the substrate parts 10 and 11. The connecting locations K are directly opposed in the longitudinal direction L, lateral direction S and thickness direction T. The joint is formed with a bent portion and is nearly V-shaped as seen in plan view. Additionally, groove-shaped recesses 6a are formed on both sides. These configurations are merely examples. It is sufficient that the joint 5 is configured to be able to be bending-deformed in the longitudinal direction and/or lateral direction to permit the substrate parts 10 and 11 to displace relative to each other. For example, the number of the joint 5 is not limited to one as in the embodiments of FIG. 9 to FIG. 11. A plural number of the joints 5 may be formed in the lateral direction S and/or thickness direction T.

Next, bending deformation of the joint 5 will be described with reference to FIG. 4 or FIG. 5. FIG. 4(*a*) and FIG. 5(*a*) each show a configuration of the substrate parts 10 and 11 and the joint 5 in an as designed state, FIG. 4(*b*) and FIG. 5(*b*) each show the joint 5 in a bending-deformed state when the substrate parts 10 and 11 are expanded in their dimensions, and FIG. 4(*c*) and FIG. 5(*c*) each show the joint 5 in a bending-deformed state when the substrate parts 10 and 11 are contracted in their dimensions. Thus, as a consequence of the bending deformation of the joint 5, it is possible to dimensionally absorb the expansion or contraction of the substrate parts 10 and 11 that are formed of a synthetic resin foam body. By this, the deformation of the substrate 2 may be suppressed and, thus, the dimensional accuracy in the longitudinal direction L and/or lateral direction S of the long foam body 1 formed of a synthetic resin foam body can be stabilized.

The substrate parts 10 and 11 and the joint 5 of the joint forming portion 12 may be integrally formed together by subjecting the thermoplastic resin expanded beads to in-mold molding. For example, a pair of openable and closable male and female molds configured, when in a closed position, to form a mold cavity consistent in shape with the substrate 2 which has a desired shape and is provided with a joint 5 having a predetermined shape at a predetermined position may be used to simultaneously and integrally form the substrate parts 10 and 11 and the joint 5. If desired, the frame 3 may be inserted into the mold cavity when the above in-mold molding is carried out so that the long synthetic resin foam 1 is produced in one step. Alternatively, the joint 5 may be formed, after the substrate 2 has been produced by in-mold molding, by forming through hole-recesses 6 and groove-shaped recesses 6a at desired positions using a cutter and a grinder, thereby to form the joint forming portion 12 in the substrate 2.

Next, the width of the recesses 6 and 6a will be descried. The width of the recesses 6 and 6a is preferably made the same as or greater than the maximum dimension of the predicted dimensional variation at the time of in-mold molding from the standpoint of workability in the case of fitting the frame 3 into the substrate 2 and of relaxing a dimensional change by shrinkage of the substrate 2 after insert molding in the case of integral molding of the substrate 2 and frame 3. More specifically, it is preferred that the width of the recesses 6 and 6a in the direction parallel with the connecting section 23 of the frame 3 is 3 mm to 70 mm, more preferably 5 mm to 50 mm, particularly 10 mm to 25 mm. Since the long foam body 1 constituted of a synthetic resin foam body may be provided with a plurality of the joint forming portions 12, the width of the recesses 6 and 6a may be proportionally distributed according to the number of the recesses. It is more desirable that those portions of the joint 5 which define the peripheral edges of the recesses 6 and 6a and the corner portions of substrate parts 10 and 11 be rounded (formed with "R") for reasons of avoiding the concentration of stress.

The long synthetic resin foam body of the present invention is suited as a rear seat core material for vehicles such as a seat back core material and a seat cushion core material. When the foam body is used as a seat cushion core material for a vehicle, the widthwise direction of the vehicle is "the longitudinal direction" thereof, the front to rear direction of the vehicle is "the lateral direction" and the direction normal to the widthwise direction of the vehicle and to the front to rear direction of the vehicle is "the thickness direction". When the foam body is used as a seat back core material, the widthwise direction of the vehicle is "the longitudinal direction" thereof, the up-down direction of the seat back of the vehicle is "the lateral direction" and the direction normal to the widthwise direction of the vehicle and to the up-down direction of the seat back of the vehicle is "the thickness direction".

The effect of the present invention will be next described by way of examples. A rear seat back to be mounted on an automobile is assumed as a foam body in the present example. Using a polypropylene resin expanded beads-molded body having a density of 0.03 g/cm³ as a substrate, a long synthetic resin foam body having a length, in the widthwise direction of the vehicle when mounted, of 1,300 mm, a width of 450 mm and a thickness of 80 mm was obtained. A groove 4 was formed in the substrate at a position 50 mm inward from the both side edges. A rectangular annular frame made of a stainless hollow pipe having a diameter of 10 mm was closely fitted in the groove at an ambient temperature.

In this case, three test specimens having dimensional variations in the longitudinal direction L of ±0 mm, +10 mm, −10 mm were prepared as imitation of dimensional variation at the time of molding of real polypropylene resin expanded beads substrates by volume production. As shown in FIG. 2(b), two groove-shaped recesses 6a which extended oppositely in the thickness direction and each of which had a width of 5 mm and a depth of 65 mm were formed in each specimen at a middle portion in the longitudinal direction thereof to provide each specimen with the joint-forming portion 12. From each of the thus obtained test specimens, a test piece having a length of 350 mm, a width of 100 mm and a thickness of 25 mm and containing no skin was cut out and subjected to a three point bending test according to JIS K7221-2 (2006) in the atmosphere of 23°±2° C. and a relative humidity of 50±5% using an inter-fulcrum distance of 300 mm and a test speed of 20±1 mm/min, thereby obtaining a load deflection curve. The test piece showed a deflection of over 100 mm (specimen was not broken even at a deflection of 100 mm or more) and a load of 26 N at the 20 mm deflection.

Each of the test specimens was provided with the groove 4 having the same width as that of the frame to be fitted thereinto. A worker was able to be fit the frame 3 into the groove 4 of the specimen by applying thereto such a force as to stretch the specimen in the case of the test specimen having a short length (−10 mm) and to press the frame toward the joint forming portion 12 in the case of the test specimen having a long length (+10 mm). By performing such an operation, the length of each of the +10 mm and −10 mm specimens was changed to the standard dimension. Namely, dimensional variation at the time of the preparation of the long expanded beads-molded bodies was able to be absorbed at ambient temperature.

Thereafter, the test specimens that imitated a seat back were each allowed to stand in an environment at 80° C. and −30° C. for a given period of time to observe changes of their dimensions by the temperature changes. In a case where a simple plate of a polypropylene resin expanded beads-molded body having the same size was used, expansion and contraction of about ±8 mm were observed at 80° C. and −30° C., respectively. This value is considered to increase by ±10 mm when dimensional variation in molding of expanded beads-molded substrate by volume production is assumed. If such an increased dimensional difference is caused, there is a possibility that the foamed body itself will be deformed due to formation of a gap or due to interaction between it and an adjacent foam body. However, in the long foam bodies of the present invention which were each constituted of the expanded beads-molded substrate 2 provided with the joint forming portion 12, the groove 4 and the frame closely fitted into the groove without gaps, the frames were found to restrict the expansion and contraction of the expanded beads-molded substrates notwithstanding the fact that the substrates had dimensions of standard dimension, +10 mm and −10 mm before having been fitted with the iron frames. Namely, the foam bodies were able to have the dimensions as designed. Further, expansion and contraction due to the temperature changes were found to be not greater than ±3 mm. The long foam bodies of the present invention surely showed sufficient dimensional stability.

Figure 6B:
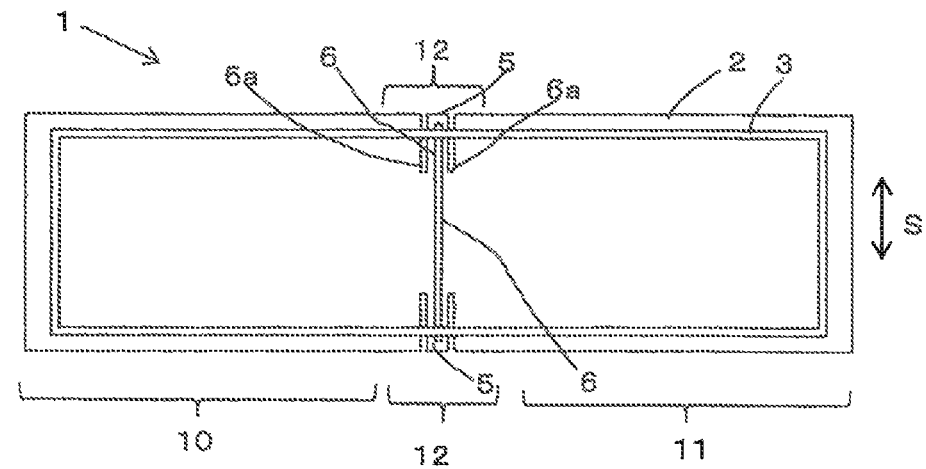

Another example of the present invention will be next described. A core material for a rear seat cushion to be mounted on an automobile is assumed as a part in this example. A mold tool having a shape of the foam part composed of two spaced apart substrate parts separated in the longitudinal direction as shown in FIG. 1, was provided. A wire frame that was made of an iron wire material and had a roughly rectangular annular shape, a diameter of 4.5 mm and a tensile strength (JIS G3532 SWM-B) of 500 N/mm² was inserted as the frame into the mold tool and supported therein. Subsequently, the mold tool was closed. Then, polypropylene-based resin expanded beads having a bulk density of 0.03 g/cm³ and a bead diameter of about 4 mm were filled in the mold tool. Then, in-mold molding was carried out by heating the inside the mold tool with steam. The heating method was as follows. Steam was fed for 5 seconds for preheating (air purging step) while maintaining drain valves on both side molds in an open state. One-direction heating was then carried out with a molding steam pressure of 0.22 MPa(G) and another one-direction heating was carried out in the opposite direction with a molding steam pressure of 0.04 MPa(G). Subsequently, full heating was carried out at a molding steam pressure of 0.3 MPa(G) from both sides. After completion of the heating step, the pressure was released and air cooling was carried out for 30 seconds. Then, water cooling was carried out for 240 seconds to obtain a polypropylene-based resin expanded beads-molded body having the frame integrally molded along the periphery of the expanded beads-molded body. The obtained expanded-beads-molded body was thereafter dried and aged in the atmosphere of 60° C. for 24 hours, thereby obtaining a long foam body which had a length of 1,300 mm, a width of 450 mm and a thickness of 100 to 150 mm and which was formed of two bisected substrate parts that were spaced apart in the longitudinal direction and connected to each other by joints formed in two locations. The joints of a joint forming portion had a shape as shown in FIG. 6(b) (groove-shaped recess 6a had a width of 10 mm and a depth of 80 mm) and provided at two locations in the lateral direction so as to cover the connecting sections of the insert-molded frame. The frame was embedded in the expanded beads-molded body at a position spaced inside from the peripheral edge of the substrate by a distance of 50 mm and also spaced in the thickness direction from the bottom face of the molded body by a distance of 50 mm. The expanded beads-molded body was formed in a sloped shape such that the thickness thereof was 150 mm at its one end which corresponded to the front end when used as the core material of the rear seat cushion, and 100 mm at its another end which corresponded to the rear end. From the thus obtained long foam body, a test piece having a length of 350 mm, a width of 100 mm and a thickness of 25 mm and containing no skin was cut out and subjected to a three point bending test according to JIS K7221-2 (2006) in the atmosphere of 23°±2° C. and a relative humidity of 50±5% using an inter-fulcrum distance of 300 mm and a test speed of 20±1 mm/min, thereby obtaining a load deflection curve. The test piece showed a deflection of 100 mm or more (specimen was not broken even at a deflection over 100 mm) and a load of 26 N at the 20 mm deflection.

In the long foam body of the present invention after the above-described insert molding, the distance between the two substrate parts in a spaced apart state was widened by a length of 15 mm at its joint forming portion as compared with the dimension of the mold. The long foam body also showed an upward warp of 3 mm. In a comparative long foam body which was the same as above except for being provided with no joint forming portion was found to show an upward warp of 10 mm when subjected to the similar measurement.

Further, the obtained long foam body was allowed to stand in an atmosphere at 80° C. and −30° C. for a given period of time to observe changes of their dimensions by the temperature changes. The long foam body of the example according to the present invention showed expansion and contraction of about ±3 mm or less in the above temperature change. In a comparative long foam body which was the same as above except for being provided with no joint forming portion was found to show expansion and contraction of about ±8 mm in the above temperature change.

As described in the foregoing, the long foam body of the present invention showed suppressed dimensional change by temperature change and suppressed rise of the bottom face by warpage after in-mold molding and, therefore, showed sufficient dimensional stability.

EXPLANATION OF SYMBOLS

1: long foam body
2: substrate
3: frame
5: joint
6: through hole recess
6a: groove-shaped recess
10 and 11: substrate part
12: joint forming portion
21: fitting-engagement portion
22: displacement regulating section
23: connecting section
K: connecting location
L: longitudinal direction,
S: lateral direction
T: thickness direction

What is claimed is:

1. An elongated synthetic resin foam body comprising:
a thermoplastic resin expanded beads-molded substrate that has a longitudinal direction, a lateral direction and a thickness direction, and
a frame that has a pair of displacement regulating sections which are longitudinally or laterally spaced apart from each other and provided in said substrate at positions spaced inward from opposing longitudinal or lateral ends of said substrate and at least one connecting section which connects the paired displacement regulating sections to each other,
said substrate having at least one joint forming portion that divides said substrate in a direction intersecting the connecting section into two or more substrate parts,
said joint forming portion having at least one joint which connects adjacent two substrate parts to each other, and which has one end connected to one of adjacent two substrate parts at a first connecting location and the other end connected to the other one of the substrate parts at a second connecting location,
wherein said second connecting location is positioned to be offset from said first connecting location in at least two directions selected from the group consisting of the longitudinal direction, lateral direction and thickness direction, or to be aligned with said first connecting location in all of the longitudinal direction, lateral direction and thickness direction with said joint being formed into a curved or bent shape, so that said joint is deformable to permit a relative displacement between the adjacent two substrate parts when said substrate contracts or expands.

2. The elongated synthetic resin foam body as recited in claim 1, wherein each of said displacement regulating sections is in closely fitting engagement with said substrate.

3. The elongated synthetic resin foam body as recited in claim 2, wherein said substrate has a pair of laterally extending grooves provided adjacent to both longitudinal ends of said substrate and said displacement regulating sections are in the form of plates closely fitting engagement with said grooves.

4. The elongated synthetic resin foam body as recited in claim 2, wherein said substrate has a pair of protrusions provided adjacent to both longitudinal ends of said substrate and said displacement regulating sections are in the form recesses that are in closely fitting engagement with said protrusions.

5. The elongated synthetic resin foam body as recited in claim 2, wherein said substrate has a pair of holes provided adjacent to both longitudinal ends of said substrate and said displacement regulating sections are in the form of protrusions closely fitting engagement with said holes.

6. The elongated synthetic resin foam body as recited in claim 1, wherein said frame has an annular structure in which said paired displacement regulating sections are connected at their ends by a pair of the connecting sections.

7. The elongated synthetic resin foam body as recited in claim 1, wherein the thermoplastic resin expanded beads are polyolefin-based resin expanded beads.

8. The elongated synthetic resin foam body as recited in claim 1, wherein the thermoplastic resin expanded beads are expanded beads of a base resin that is a composite resin of a polyolefin-based resin and a polystyrene-based resin.

9. The elongated synthetic resin foam body as recited in claim 1, wherein the thermoplastic resin expanded beads-molded substrate has a bending deflection of 20 mm or more and a load of 2 to 100 N at bending deflection of 20 mm, both of which are measured by a bending test method according to JIS K7221-2 (2006).

10. The elongated synthetic resin foam body as recited in claim 1, wherein said frame is an annular metal wire frame having first two opposed frame sections serving as said displacement regulating sections and second two opposed frame sections that connect the first two opposed frame sections to each other and that serve as said connecting section.

11. The elongated synthetic resin foam body as recited in claim 1, wherein said frame is integrally embedded in said substrate by insert molding.

\* \* \* \* \*